INTERCARRIER SOUND TELEVISION RECEIVERS

Filed April 29, 1954 2 Sheets-Sheet 1

INVENTOR.
Eugene O. Keizer
BY
ATTORNEY

Aug. 25, 1959 E. O. KEIZER 2,901,533

INTERCARRIER SOUND TELEVISION RECEIVERS

Filed April 29, 1954 2 Sheets-Sheet 2

INVENTOR.
Eugene O. Keizer
BY
ATTORNEY

1

2,901,533

INTERCARRIER SOUND TELEVISION RECEIVERS

Eugene O. Keizer, Princeton, N.J., assignor to Radio Corporation of America, a corporation of Delaware Application April 29, 1954, Serial No. 426,400

12 Claims. (Cl. 178—5.8)

The present invention relates to new and improved intercarrier sound television receivers and, more particularly, to apparatus for separating the sound carrier wave from the video information.

Present television standards require that video or image information be transmitted via amplitude modulation of a first carrier wave and that the audio or sound information be transmitted through the agency of a frequency-modulated carrier wave spaced in frequency a fixed amount from the video carrier wave. Specifically, the video and sound carrier waves in accordance with present-day standards are spaced apart 4.5 megacycles, which relationship is fixed at the transmitter station and is independent of such variables, for example, as the local oscillator frequency of a heterodyne television receiver.

The intercarrier sound principle exploits the fixed frequency relationship set forth by eliminating the theretofore customary practice of providing separate intermediate frequency channels for the heterodyned video and audio sound carrier waves. Thus a receiver of the intercarrier type provides a single intermediate frequency channel common to both carrier waves and the two waves are applied to the usual video or second detector. By reason of the non-linear characteristic of the second detector, the two intermediate frequency waves mix to produce a beat note whose nominal frequency is 4.5 megacycles, which beat note is in addition to the detected video signals.

It is a primary object of the present invention to provide novel and improved means in connection with a television receiver of the intercarrier sound type for separating the sound beat from the video signals.

By reason of the widespread use of receivers of the type in question, there have been various proposals for performing the function of separating the 4.5 megacycle beat from the video signals derived in the second detector circuit. It may be stated generally that in a television receiver second detector it is desirable, in order to obtain maximum video signal voltage output and video band width, to maintain the capacity shunting the video output as small as possible. In accordance with certain prior art proposals, the 4.5 megacycle beat is selected from the output of the video detector through the use of a tuned circuit in parallel with the video detector load circuit and having a natural series resonant frequency equal to that of the sound beat. Thus a sound take-off of that type serves, in addition to its function of selecting the sound transmitter frequency wave, as a "sound trap" insofar as the following stage of video amplification is concerned. While such circuits have been found to be effective in commercial receivers, the fact that they shunt the video output stage with a capacitive path results in undesirable loading of the video channel with the attendant loss of amplitude of the video information. That is to say, the sound take-off impedance is effectively in parallel with the video load impedance of the detector circuit, so that loading is produced in addition to that which is inherently present in the circuit.

Hence, it is a further object of the present invention to provide, in an intercarrier sound television receiver, a sound take-off means which does not appreciably increase the total effective shunt capacity across the diode detector video output.

Generally, the present invention may be viewed as providing sound take-off means in a television receiver of the type in question, which means comprises a frequency selective circuit for the 4.5-megacycle (intercarrier) beat in series with the intermediate frequency wave source and the video detector and load. Stated otherwise, if the intermediate frequency (I.F.) amplifier stage be viewed as a generator, the sound take-off means in accordance with the present invention would be in a series circuit with the generator and the video detector load impedance. In order to insure electrical isolation of the sound take-off means from the video load of the detector, whereby to decrease the capacitive loading, the sound take-off circuit is specifically connected in series with the I.F. output circuit and alternating current (A.C.) ground potential. From an arrangement of the type set forth ancillary advantages are obtained, such, for example, as that of simplifying the tuning of the sound take-off circuit, as will appear more fully hereinafter.

2

Additional objects and advantages of the present invention will become apparent to persons skilled in the art from a study of the following detailed description of the accompanying drawings, in which:

Fig. 1 illustrates, by way of block and schematic diagram, a television receiver embodying the principles of the present invention;

Fig. 1*a* is a simplified, equivalent showing of a portion of the circuitry of Fig. 1;

Fig. 2 illustrates schematically a prior art arrangement for selecting the intercarrier sound beat from the video information;

Fig. 2*a* is an equivalent circuit diagram of the apparatus of Fig. 2;

Figures 1, 1A:
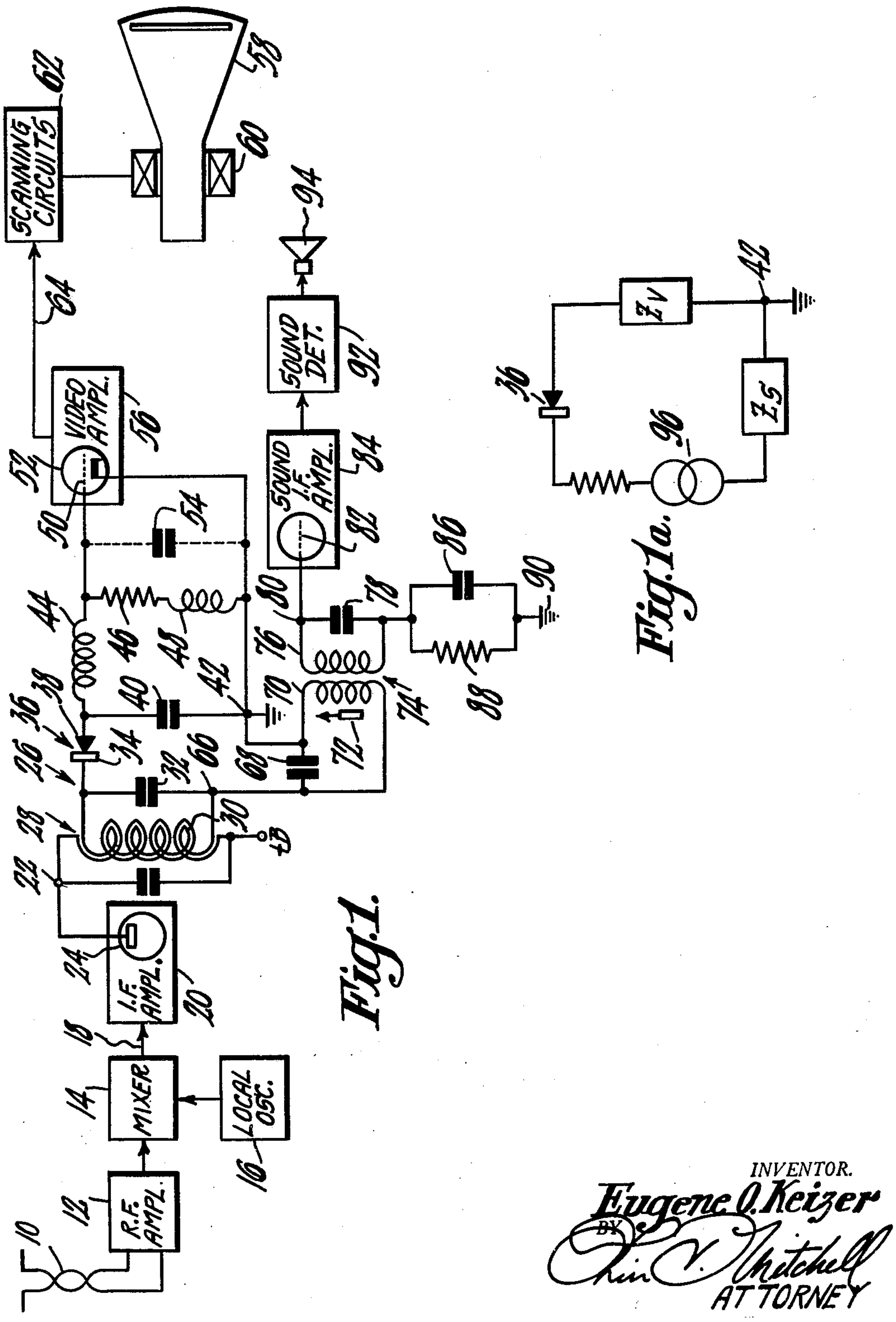

Referring to the drawing and, particularly, to Fig. 1 thereof there is shown in its entirety, but in diagrammatic form, a typical television receiver of the intercarrier sound variety. An antenna 10 intercepts the amplitude-modulated television image carrier wave and the frequency-modulated sound carrier wave. One specific television channel frequency arrangement which may be cited by way of example is one in which the sound carrier wave has a frequency of 71.75 megacycles and in which the video carrier wave has a frequency of 67.25 megacycles. These two waves are applied to a radio frequency (R.F.) amplifier 12 which, in turn, applies the waves to a mixer stage 14. A local oscillator 16 tuned, for example, to 113 megacycles provides a heterodyning wave of that frequency to the mixer 14. The mixer beats the two radio frequency waves with the wave from oscillator 16 to provide at the terminal 18 a video I.F. wave of 45.75 megacycles and a sound I.F. wave of 41.25 megacycles. Both of the intermediate frequency waves are subjected to several stages of amplification indicated by the block 20 designated "I.F. amplifier" and are available at terminal 22 in the anode circuit of the final I.F. amplifier tube 24. Circuitry for the R.F., mixer and I.F. stages are described in detail in "Television Review," by A. Wright, March 1947 issue of RCA Review.

Although the specific mode of coupling between the I.F. amplifier tube 24 and the video detector circuit 26 does not constitute a part of the present invention, it is illustrated herein in the interest of completeness of description as including a double-tuned transformer arrangement 28 of well-known form. The secondary winding 30 of the transformer 28, is therefore, shunted by a capacitor 32 in the usual manner to provide selective tuning to the intermediate frequencies. The upper terminal of the tuned secondary winding 30 is connected to the cathode 34 of a diode 36 which also includes an anode 38. A capacitor 40 is connected between the anode 38 of the diode detector 36 and terminal 42 which is, in turn, connected to ground. The function of capacitor 40 is that of providing a low impedance path to ground for the intermediate frequencies, so that the detected video signals which range in frequency from zero to four megacycles are substantially free of the higher frequencies. Since the operation of a diode detector is well-known to those skilled in the art, it need not be described in detail here. It should, however, be noted that the diode 36 serves as a "peak detector" which detects the envelope of the amplitude-modulated video I.F. carrier wave. The video signals are coupled through the circuit including the series peaking coil 44 and the shunt path comprising a load resistor 46 and shunt peaking coil 48 to the control electrode 50 of a first video amplifier tube 52. Inherently present as a loading on the video amplifier tube 52 is its input capacitance shown in dotted lines at 54.

By virtue of the non-linearity of the diode detector 36, there results a heterodyning of the video and sound I.F. waves, whereby there is produced a wave whose nominal frequency is equal to 4.5 megacycles (the difference between the two I.F. carriers) and which is frequency-modulated by the sound information. Prior to describing the apparatus whereby the present invention selects the intercarrier sound beat from the video detector circuit, it may be noted that, insofar as image reproduction is concerned, the detected video signals are amplified by the tube 52 and, if desired, by additional stages which may be employed in the block 56 and are applied to the beam intensity controlling electrode (not shown) of a kinescope 58. An electron beam (not shown) in the kinescope is caused to scan a raster as by means of electromagnetic fields produced by the deflection yoke 60 which is provided with suitable line and field frequency sawtooth currents from the scanning circuits 62. The scanning circuits are synchronized with the scanning at the transmitter station by means of synchronizing pulses forming a part of the composite video signal. That is, synchronizing pulses are applied via lead 64 to the scanning circuits 62 in the usual manner.

Returning to the sound or video detector circuit 26, it may be seen that the lower terminal 66 of the secondary winding of the I.F. output transformer 28 is connected to the ground terminal 42 through a parallel resonant circuit comprising the capacitor 68 and the inductance 70. These last-mentioned components are tuned to the frequency of 4.5 megacycles (the intercarrier beat) whereby to provide a high impedance at that frequency. For tuning the resonant circuit 68, 70 there is or may be provided a tuning slug 72 which serves to vary the inductance of the coil 70 in a well-known fashion. The inductance 70 may, as shown in Fig. 1, comprise the primary winding of a transformer 74 whose secondary winding 76 is tuned to parallel resonance at the 4.5-megacycle frequency by a capacitor 78. The upper terminal 80 of the tuned secondary winding 76 is connected to the control electrode 82 of a sound I.F. amplifier stage 84. Self-bias for the control electrode 82 is afforded by the shunt combination of capacitor 86 and grid leak resistor 88 which are connected to ground at 90.

Without describing at this time the operation of the sound take-off arrangement of Fig. 1, it will be seen that the frequency modulated 4.5-megacycle wave is selected via the double tuned transformer 74 and amplified by the stage 84. A suitable frequency modulation detector 92 derives the sound information from the 4.5-megacycle wave for reproduction by a loud speaker 94.

In Fig. 1, the video load impedance comprises the series peaking coil 44 and the shunt path including the load resistor 46 and peaking coil 48. Additionally, the several frequencies including the video image frequencies and the 4.5-megacycle beat flow in part through the capacitor 40 and the input capacitance 54 of the video amplifier tube 52. In the interest of simplicity, such video loading impedance is indicated in the equivalent circuit diagram of Fig. 1*a* as the lumped impedance $Z_V$ which is supplied with the video signals from the generator 96 via the video detector diode 36. The generator 96 actually comprises the output circuit of the I.F. amplifier 24 which, in Fig. 1, is in the form of the double-tuned transformer 28. The resonant circuit comprising capacitor 68 and inductance 70 of Fig. 1 and which is tuned to the intercarrier frequency of 4.5 megacycles is represented by the impedance $Z_S$. Thus it may be seen from the equivalent diagram of Fig. 1*a* that the sound take-off circuit ($Z_S$) is in series with the generator 96 (I.F. output circuit), detector diode 36 and the detector video load impedance (impedance $Z_V$). The ground connection 42 in Fig. 1*a* is located at the same point at which it occurs in Fig. 1. It may also be noted from the relative showings of Figs. 1 and 1*a* that the sound take-off circuit of the present invention is electrically remote from the video load impedance.

In the operation of the circuit of Figs. 1 and 1*a*, it is to be noted that the sound take-off circuit comprising the capacitor 68 and inductance 70 provides a high impedance at the 4.5-megacycle frequency. Insofar as the video signal frequencies are concerned, however, the sound take-off circuit presents a relatively low impedance, so that the currents of video signal frequencies are not appreciably attenuated by the sound take-off. Moreover, by reason of the fact that the sound take-off impedance $Z_S$ (Fig. 1*a*) is in series with the video load impedance $Z_V$, the sound take-off circuit does not produce any shunt loading on the video impedance, as is the case with certain prior art arrangements.

Figures 2, 2A:
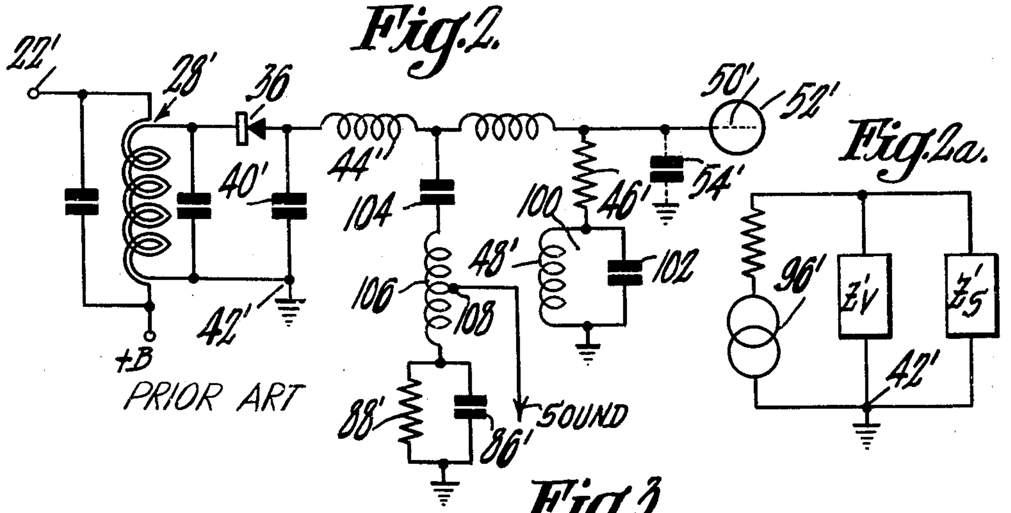

Fig. 2 illustrates, for purposes of comparison, a popular form of sound take-off circuit currently employed in commercial television receivers. Wherever possible, reference numerals in Fig. 2 indicative of components which are present in the circuitry of Fig. 1 will be the same reference numbers bearing the prime (′) notation. The I.F. carrier waves are coupled from terminal 22′ via the double-tuned I.F. transformer 28′ to the diode detector 36′. Filter capacitor 40′ provides a low impedance path for the intermediate frequencies to ground at terminal 42′. The video load imedance of the detector 36′ comprises the series peaking coil 34′ and the load resistor 46′, the latter being in series with a resonant circuit 100 comprising a shunt peaking coil 48′ and capacitor 102, which circuit serves to accentuate the video frequency signals at the input or control electrode 50′ of the video frequency amplifier 52′. Again, as in the case of Fig. 1, the video amplifier inherently includes an input capacitance 54′. In the prior art arrangement of Fig. 2, the 4.5-megacycle beat bearing the sound information as frequency modulation is selected from the output of the video detector 36′ by means of a series resonant circuit comprising the capacitor 104 and inductance 106. An intermediate point 108 on inductance 106 constitutes the sound take-off terminal which may, for example, be connected to the control electrode (not shown) of a sound I.F. amplifier. Biasing for such an amplifier is or may be provided by the capacitor 86′ and resistor 88′. The series resonant circuit 104, 106 of Fig. 2 is tuned to 4.5 megacycles whereby to present a low impedance to the intercarrier sound wave. In this manner, the sound take-off circuit additionally serves to trap the sound frequency whereby to prevent its appearance at the input of the amplifier 52′. Unfortunately, however, the sound take-off impedance in Fig. 2 is in parallel with the video load impedance, as shown by the equivalent diagram of Fig. 2*a* wherein these impedances are represented, respectively, by the blocks $Z_S'$ and $Z_V'$, which places a capacitive load on the video load impedance which necessarily attenuates the video signal frequency. Such capacitive loading at video frequencies, moreover, occurs despite the fact that the sound take-off series resonant circuit is tuned to 4.5 megacycles. That is, for the higher video frequencies, the loading imposed by the serially connected capacitor and inductance is actually greater than that which the capacitor alone would cause, since the inductive reactance in the circuit increasingly cancels the capacitive reactance as the frequency increases toward resonance.

From the foregoing, those skilled in the art will appreciate the fact that the sound take-off arrangement of the present invention, as illustrated in accordance with the embodiment of Fig. 1, presents substantially no capacitive loading of the video output of the video detector, in view of the fact that the sound take-off impedance is in series with the I.F. amplifier output. Specifically, the sound take-off impedance $Z_v$ (Fig. 1*a*) is serially connected between the I.F. amplifier output circuit represented by generator 96 and A.C. ground at terminal 42. The location of the sound take-off impedance such that one end thereof is at A.C. ground potential also simplifies the tuning of its inductance 70. That is to say, as a practical matter, a tuning slug such as that shown at 72 in Fig. 1 must be adjustably positioned as by means of a screw driver, for example. Even with a screw driver of insulating material such as is normally employed for such operations the capacity between the hand of the person effecting the slug adjustment to ground presents a difficult problem in arrangements where the sound take-off coil is electrically located at some point having a high potential with respect to ground. Thus, for example, if the impedance $Z_s$ in Fig. 1*a* were located serially between the diode 36 and the video load impedance $Z_v$, its inductance would necessarily be at some potential which is high with respect to ground. With such an arrangement, therefore, as soon as one were to place a screw driver in position for tuning the inductance, the capacitance between his hand and ground would effectively insert a shunt capacitance into the circuit which is not normally present. Hence, tuning of the inductance with the capacity of the hand involved would actually result in an erroneous tuning condition once the hand was removed. Since the sound take-off coil 70 of the present invention is connected to A.C. ground potential at one end, tuning of the coil as by means of the slug 72 does not involve any problem of capacity of the hand wielding the screw driver, since both the coil and the core are grounded.

Figures 3, 4:
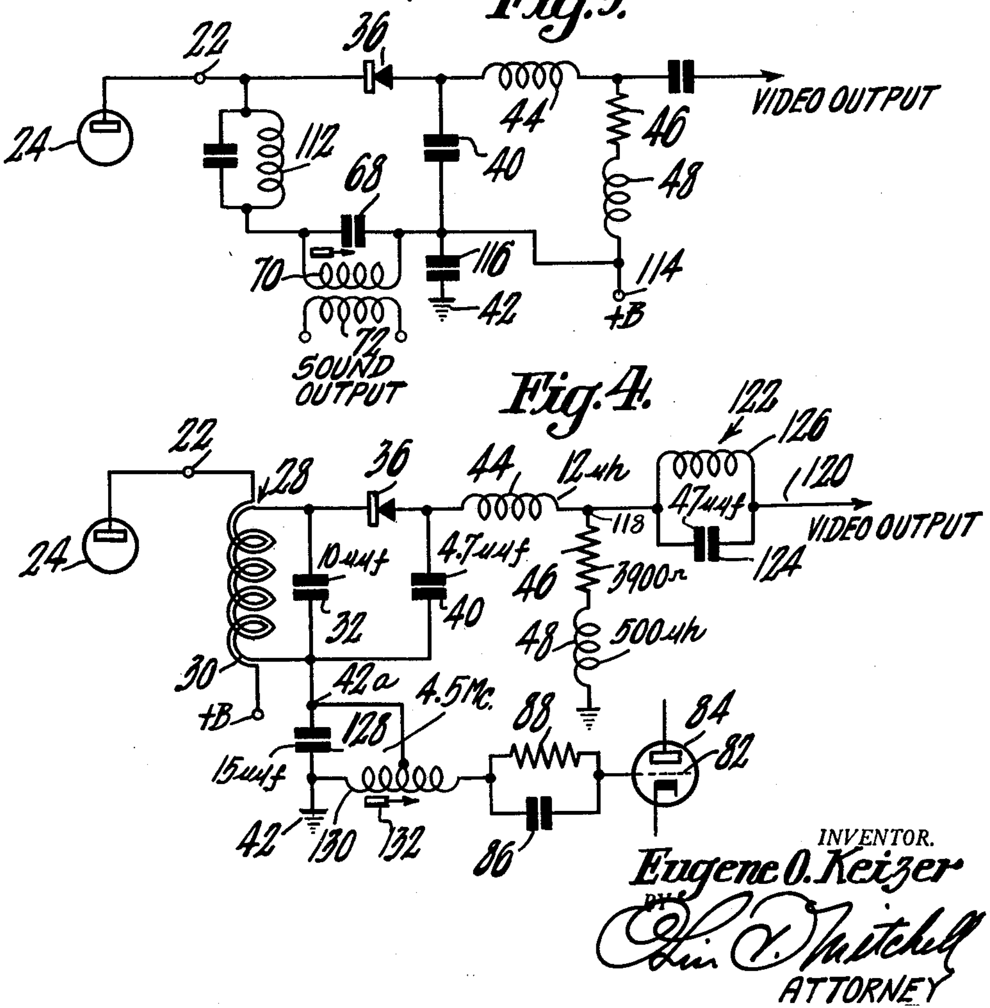
Fig. 3 illustrates schematically another form of the invention.
Fig. 4 illustrates still another form of the invention.

While Fig. 1 illustrates one embodiment of the invention in which the sound take-off circuit is serially connected between the I.F. amplifier output circuit and a point of A.C. current potential, it will be appreciated that the invention may take other forms. Fig. 3 illustrates another form of the invention similar to that of the embodiment of Fig. 1, with the exception that the I.F. amplifier output circuit comprises a single tuned inductance 112 instead of the double tuned transformer 28 of Fig. 1. Reference numerals identical to those in Fig. 1 indicate corresponding components. In Fig. 3, the use of a single tuned coil 112 necessitates the elevation of the detector circuit to +B potential, so that the I.F. amplifier tube 24 may be suitably supplied with that operating potential as indicated by source 114. In view of such circuit arrangements, Fig. 3 additionally includes a bypass capacitor 116 to ground at terminal 142 for bypassing the +B terminal 114 for alternating current. As in Fig. 1, the circuit of Fig. 3 includes a sound take-off impedance comprising the parallel combination of capacitor 68 and inductance 70 which is tuned to the intercarrier sound beat frequency of 4.5 megacycles. The sound information is coupled to succeeding stages via a secondary winding 76 which is magnetically coupled to the primary winding 70. The following points of similarity between circuits of Figs. 1 and 3 should be noted: the equivalent diagram of Fig. 3, if drawn, would include a series circuit comprising a generator (the tuned winding 112), detector 36, a video loading impedance and the sound take-off impedance. Moreover, the sound take-off impedance in Fig. 3 is also serially connected between the generator (inductance 112) and A.C. ground (the upper terminal of capacitor 116). Thus the circuit of Fig. 3, as has been described in connection with the arrangement of Fig. 1, affords the advantages of a low capacity sound take-off circuit and ease of tuning. Another point of interest common to both the circuits of Figs. 1 and 3 is that the sound take-off circuit comprising the parallel resonant circuit tuned to 4.5 megacycles may have a high "Q" whereby to afford a voltage gain for the intercarrier sound beat frequency.

Although the circuits of Figs. 1 and 3 both employ sound take-off arrangements involving a double-tuned transformer, it is also within the scope of the invention to employ a single tuned circuit as the sound take-off means. Such an arrangement, and one which may be preferred by reason of its simplicity, is that illustrated in Fig. 4 wherein reference numerals identical to those used in Figs. 1 and 3 indicate corresponding components. In Fig. 4, the tuned secondary winding 30 of transformer 28 applies the two I.F. waves to the detector 36 whose output is bypassed for the intermediate frequencies by a capacitor 40 to terminal **42*a*. The video frequency load impedance for the detector 36 comprises the series and shunt peaking coils 44 and 48, respectively, and the load resistance 46. Included between the junction of the peaking coil paths (terminal 118) and the video output terminal 120 (which may be the control electrode of a video amplifier) is a series trap circuit 122. The trap circuit 122 comprises a parallel tuned circuit consisting of capacitor 124 and inductance 126 and is tuned to the intercarrier sound beat frequency of 4.5 megacycles. This series trap arrangement effectively prevents the passage of the sound beat frequency from terminal 118 to terminal 120**.

Terminal **42*a* at the junction of the I.F. output transformer secondary winding 30 and its tuning capacitor 32 is connected to ground at 42 through a tuned circuit comprising the capacitor 128 and the inductance 130. These components are so adjusted as by means of the slug 132 as to have a resonant frequency of 4.5 megacycles. Specifically, terminal 42*a* is connected to an intermediate point on the inductance 130, whereby a voltage step-up action is afforded by the two sections of the inductance 130. The 4.5-megacycle beat is applied to the control electrode 82 of a sound I.F. amplifier 84 through the parallel combination of the grid leak capacitor 88 and bypass capacitor 86**. Again, as in the cases of Figs. 1 and 3, the circuit of Fig. 4 embraces the principles of the present invention in that its sound take-off impedance is serially connected between one end of the I.F. amplifier circuit and ground and is, moreover, in series with the video load impedance, rather than in shunt therewith as in the prior art arrangements mentioned. Values suitable for the several components of the circuit of Fig. 4 are shown on the drawing as illustrative of one satisfactorily operative embodiment and are not given as by way of limitation.

From the foregoing, those skilled in the art will appreciate that the present invention provides basically a novel arrangement for a sound take-off circuit in an intercarrier sound television receiver in which the sound take-off circuit is in series with the source of the intermediate frequency waves and with the video detector and its video load. Moreover, the sound take-off circuit is electrically isolated from the video load impedance by reason of its serial connection between the I.F. output circuit and ground.

Having thus described my invention, what I claim as new and desire to secure by Letters Patent is:

1. In a television receiver for processing a first carrier wave modulated by image signals and a second carrier wave modulated by sound signals, the nominal frequencies of said carrier waves being separated by a fixed frequency, and having an amplifier including an output circuit, comprising an output transformer having an output winding, said output winding having a first and a second terminal, the combination comprising an image signal detector for deriving said image signals from said first carrier wave and for heterodyning said first and second carrier waves whereby to produce a third wave equal in frequency to said fixed frequency, said detector comprising a unilaterally conductive device having first and second electrodes, a connection between said first electrode and the first terminal of said transformer output winding for applying said carrier waves to said first electrode; a load impedance having a pair of signal terminals, one terminal being connected to said second electrode; and frequency-selective sound take-off means serially connected between the second terminal of said transformer output winding and the other terminal of said load impedance, for selecting said third wave, whereby said transformer output winding, said unilaterally conductive means, said load impedance and said sound take-off means are in series with each other.

2. In a television receiver for processing a first carrier wave modulated by image signals and a second carrier wave modulated by sound signals, the nominal frequencies of said carrier waves being separated by a fixed frequency, and having an amplifier including a load impedance which includes two terminals, an image signal detector for deriving said image signals from said first carrier wave and for heterodyning said first and second carrier waves whereby to produce a third wave equal in frequency to said fixed frequency, said detector comprising a unilaterally conductive device having first and second electrodes, a connection between said first electrode and one of the terminals of said amplifier load impedance for applying said carrier waves to said first electrode; a detector load impedance having a pair of signal terminals, one terminal being connected to said second electrode; and frequency-selective sound take-off means serially connected between the other of said terminals of said amplifier load impedance and the other of said detector load terminals, said last-named means being tuned to the frequency of said third wave.

3. In a television receiver for processing a first carrier wave modulated by image signals and a second carrier wave modulated by sound signals, the nominal center frequencies of said carrier waves being separated by a fixed frequency, and having an amplifier including an output circuit, an image signal detector for deriving said image signals from said first carrier wave and for heterodyning said first and second carrier waves whereby to produce a third wave equal in frequency to said fixed frequency, said detector comprising a unilaterally conductive device having first and second electrodes, a connection between said first electrode and said amplifier output circuit for applying said carrier waves to said first electrode; a load impedance having a pair of signal terminals, one terminal being connected to said second electrode and the other of said terminals being connected to a point of fixed potential; and frequency-selective sound take-off means serially connected between said amplifier output circuit and a point of fixed potential for selecting said third wave.

4. In a television receiver for processing a first carrier wave modulated by image signals and a second carrier wave modulated by sound signals, the center frequency of said second carrier wave being separated from the frequency of said first carrier wave by a fixed frequency, and having an amplifier including an output circuit providing a pair of amplifier output terminals, the combination comprising an image signal detector for deriving said image signals from said first carrier wave and for heterodyning said first and second carrier waves whereby to produce a third wave equal in frequency to said fixed frequency, said detector comprising a unilaterally conductive device having first and second electrodes, a connection between said first electrode and one of said pair of amplifier output terminals for applying said carrier waves to said first electrode; a load impedance having a pair of signal terminals, one terminal being connected to said second electrode and the other of said terminals being connected to a point of fixed potential; and frequency-selective sound take-off means serially connected between the other of said pair of amplifier output terminals and a point of fixed potential for selecting said third wave, whereby said amplifier output circuit, said unilaterally conductive means, said load impedance and said sound take-off means are in series with each other.

5. In a television receiver for processing a first carrier wave modulated by immage signals and a second carrier wave modulated by sound signals, the nominal center frequencies of said carrier waves being separated by a fixed frequency, and having an amplifier including an output circuit, an image signal detector for deriving said image signals from said first carrier wave and for heterodyning said first and second carrier waves whereby to produce a third wave equal in frequency to said fixed frequency, said detector comprising a unilaterally conductive device having first and second electrodes, a connection between said first electrode and said amplifier output circuit for applying said carrier waves to said first electrode; a load impedance having a pair of signal terminals, one terminal being connected to said second electrode and the other of said terminals being connected to a point of fixed potential; and frequency-selective sound take-off means comprising a parallel resonant circuit tuned to said fixed frequency and serially connected between said amplifier output circuit and a point of fixed potential for selecting said third wave.

6. In a television receiver for processing a first carrier wave modulated by image signals and a second carrier wave modulated by sound signals, the center frequency of said second carrier wave being separated from the frequency of said first carrier wave by a fixed frequency, and having an amplifier including an output transformer having an output winding, an image signal detector for deriving said image signals from said first carrier wave and for heterodyning said first and second carrier waves whereby to produce a third wave equal in frequency to said fixed frequency, said detector comprising a unilaterally conductive device having first and second electrodes, a connection between said first electrode and one end of said transformer output winding for applying said carrier waves to said first electrode; a load impedance having a pair of signal terminals, one terminal being connected to said second electrode and the other of said terminals being connected to a point of fixed potential; and frequency-selective sound take-off means comprising a resonant circuit serially connected between the other end of said transformer output winding and a point of fixed potential for selecting said third wave, whereby said transformer output winding, said unilaterally conductive means, said load impedance and said sound take-off means are in series with each other.

7. In a television receiver for processing a first carrier wave modulated by image signals and a second carrier wave modulated by sound signals, the center frequency of said second carrier wave being separated from the frequency of said first carrier wave by a fixed frequency, and having an amplifier for said modulated carrier waves including and output circuit having a high signal potential terminal and a low signal potential terminal, the combination comprising an image signal detector for deriving said image signals from said first carrier wave and for heterodyning said first and second carrier waves whereby to produce a third wave equal in frequency to said fixed frequency, said detector comprising a unilaterally conductive device having first and second electrodes, a connection between said first electrode and the high potential terminal of said amplifier output circuit for applying said carrier waves to said first electrode; a load impedance having a pair of signal terminals, one terminal being connected to said second electrode and the other of said terminals being connected to a point of fixed potential; and frequency-selective sound take-off means comprising a resonant circuit serially connected between the low potential terminal of said amplifier output circuit and a point of fixed potential for selecting said third wave, whereby said amplifier output circuit, said unilaterally conductive means, said load impedance and said sound take-off means are in series with each other, said resonant circuit having a high impedance for said fixed frequency but a relatively low impedance for said image signals.

8. In a television receiver for processing a first carrier wave modulated by image signals and a second carrier wave modulated by sound signals, the nominal frequencies of said carrier waves being separated by a fixed frequency, and having an amplifier including a load impedance which includes two terminals, an image signal detector for deriving said image signals from said first carrier wave and for heterodyning said first and second carrier waves whereby to produce a third wave equal in frequency to said fixed frequency, said detector comprising a unilaterally conductive device having first and sec- electrodes, a connection between said first electrode and one of the terminals of said amplifier load impedance for applying said carrier waves to said first electrode; a detector load impedance having a pair of signal terminals, one terminal being connected to said second electrode; frequency-selective sound take-off means comprising a parallel resonant circuit tuned to said fixed frequency and serially connected between the other of said terminals of said amplifier load impedance and the other of said detector load terminals; and means connecting the junction of said parallel resonant circuit and said detector load terminal to a point of fixed potential.

9. In a television receiver for processing a first carrier wave amplitude modulated by image signals and a second carrier wave spaced from said first carrier wave by a fixed frequency and frequency-modulated by sound signals and having an amplifier which includes a load impedance having two terminals, an image signal detector for deriving said image signals from said first carrier wave and for heterodyning said first and second carrier waves whereby to produce a third wave whose center frequency is equal to said first frequency and which is frequency-modulated by said sound signals; said detector comprising a diode having first and second electrodes; a connection between said first electrode and one of the terminals of said amplifier load impedance for applying said first and second carrier waves to said first electrode of said diode; a detector load impedance having a pair of signal terminals, one terminal being connected to said second electrode of said diode and the other of said detector load terminals being connected to a point of fixed potential; and frequency-selective sound take-off means serially connected between the other of said terminals of said amplifier load impedance and said point of fixed potential, said sound take-off means comprising a parallel combination of an inductance and a capacitance tuned to a resonant frequency equal to said fixed frequency, whereby said parallel resonant circuit presents a high impedance to said frequency-modulated third wave.

10. In a television receiver for processing a first carrier wave amplitude modulated by image signals and a second carrier wave spaced from said first carrier wave by a fixed frequency and frequency-modulated by sound signals and having an amplifier which includes a load impedance having two terminals, an image signal detector for deriving said image signals from said first carrier wave and for heterodyning said first and second carrier waves whereby to produce a third wave whose center frequency is equal to said first frequency and which is frequency-modulated by said sound signals; said detector comprising a diode having first and second electrodes; a connection between said first electrode and one of the terminals of said amplifier load impedance for applying said first and second carrier waves to said first electrode of said diode; a detector load impedance having a pair of signal terminals, one terminal being connected to said second electrode of said diode and the other of said detector load terminals being connected to a point of fixed potential; frequency-selective sound take-off means serially connected between the other of said terminals of said amplifier load impedance and said point of fixed potential, said sound take-off means comprising a parallel combination of an inductance and a capacitance tuned to a resonant frequency equal to said fixed frequency, whereby said parallel resonant circuit presents a high impedance to said frequency-modulated third wave; a utilization circuit for said sound signals, and means magnetically coupled to said parallel resonant circuit for applying said third wave to said utilization circuit.

11. In a television receiver including an amplifier for processing a first carrier wave modulated by image signals and a second carrier wave modulated by sound signals, the nominal center frequencies of said carrier waves being separated by a fixed frequency, said amplifier including an output circuit presenting a pair of output terminals, an image signal detector for deriving said image signals from said first carrier wave and for heterodyning said first and second carrier waves whereby to produce a third wave equal in frequency to said fixed frequency, said detector comprising a unilaterally conductive device having first and second electrodes, a connection between said first electrode and one of said pair of output terminals presented by said amplifier output circuit for applying said carrier waves to said first electrode; a load impedance having a pair of signal terminals, one terminal being connected to said second electrode; and frequency-selective sound take-off means serially connected between the other of said pair of output terminals presented by said amplifier output circuit and the other of said detector load terminals for selecting said third wave, whereby said amplifier output circuit, said unilaterally conductive device, said detector load impedance and said sound take-off means define a series circuit in the order named.

12. In a television receiver comprising an amplifier for processing a first carrier wave modulated by image signals and a second carrier wave modulated by sound signals, the center frequency of said second carrier wave being separated from the frequency of said first carrier wave by a fixed frequency, said amplifier developing amplified carrier waves across a first impedance, the combination comprising an image signal detector for deriving said image signals from said first carrier wave and for heterodyning said first and second carrier waves whereby to produce a third wave equal in frequency to said fixed frequency, said detector comprising a unilaterally conductive device having first and second electrodes, a connection between said first electrode and one end of said first impedance for applying said amplified carrier waves to said first electrode; a load impedance having a pair of signal terminals, one terminal being connected to said second electrode; and frequency-selective sound take-off means comprising a resonant circuit serially connected between the other end of said first impedance and the other of said detector load terminals for selecting said third wave, whereby said first impedance, said unilaterally conductive means, said load impedance and said sound take-off means are in series with each other and in the order named.

References Cited in the file of this patent

UNITED STATES PATENTS 2,504,662 Dome ---------------- Apr. 18, 1950
2,741,660 Squires -------------- Apr. 10, 1956